(12) United States Patent
Garbar et al.

(10) Patent No.: US 10,955,697 B2
(45) Date of Patent: Mar. 23, 2021

(54) LIGHT EMISSION MODIFICATION

(71) Applicant: Eyesafe, LLC, Eden Prairie, MN (US)

(72) Inventors: Arkady Garbar, Lakeville, MN (US); Bonnie G. Simmons, Concord, NH (US); Robert Visser, Austin, TX (US)

(73) Assignee: Eyesafe Inc., Eden Prairie, MN (US)

( * ) Notice: Subject to any disclaimer, the term of this patent is extended or adjusted under 35 U.S.C. 154(b) by 0 days.

(21) Appl. No.: 16/695,983

(22) Filed: Nov. 26, 2019

(65) Prior Publication Data

US 2020/0166798 A1 May 28, 2020

Related U.S. Application Data

(60) Provisional application No. 62/772,513, filed on Nov. 28, 2018.

(51) Int. Cl.
| | |
|---|---|
| *G02F 1/1335* | (2006.01) |
| *G02B 1/04* | (2006.01) |
| *G02B 5/00* | (2006.01) |
| *G02F 1/13357* | (2006.01) |
| *F21V 8/00* | (2006.01) |
| *G02B 5/20* | (2006.01) |
| *H05B 47/11* | (2020.01) |
| *G02B 5/22* | (2006.01) |

(52) U.S. Cl.
CPC ......... *G02F 1/133514* (2013.01); *G02B 1/04* (2013.01); *G02B 5/003* (2013.01); *G02B 5/208* (2013.01); *G02B 5/22* (2013.01); *G02B 6/0051* (2013.01); *G02F 1/133536* (2013.01); *G02F 1/133603* (2013.01); *H05B 47/11* (2020.01); *G02F 2001/133607* (2013.01); *G02F 2001/133614* (2013.01); *G02F 2201/086* (2013.01)

(58) Field of Classification Search
CPC combination set(s) only.
See application file for complete search history.

(56) References Cited

U.S. PATENT DOCUMENTS

| | | |
|---|---|---|
| 2,403,685 A | 7/1946 | Sachtleben |
| 2,493,200 A | 1/1950 | Land |
| 3,382,183 A | 5/1968 | Donoian |

(Continued)

FOREIGN PATENT DOCUMENTS

| | | |
|---|---|---|
| CN | 101216611 A | 7/2008 |
| CN | 101899222 A | 12/2010 |

(Continued)

OTHER PUBLICATIONS

Search Report and Examination Opinion for European Application No. 15796219.2; dated Aug. 12, 2017; date of filing: May 22, 2015; 7 pp.

(Continued)

*Primary Examiner* — Jessica M Merlin
(74) *Attorney, Agent, or Firm* — Grumbles Law PLLC; Brittany R. Nanzig; Stephen F. Wolf

(57) ABSTRACT

A display device is disclosed that includes a backlight comprising light-emitting diodes. The disclosed display device includes a liquid crystal panel configured to control transmission of light from the backlight to a viewer. The display device also includes one or more optical films that incorporate one or more light conversion materials.

20 Claims, 1 Drawing Sheet

(56) References Cited

U.S. PATENT DOCUMENTS

| | | |
|---|---|---|
| 3,482,915 A | 12/1969 | Corley |
| 3,687,863 A | 8/1972 | Wacher |
| 4,618,216 A | 10/1986 | Suzawa |
| 4,842,781 A | 6/1989 | Nishizawa |
| 4,878,748 A | 11/1989 | Johansen |
| 4,966,441 A | 10/1990 | Conner |
| 4,989,953 A | 2/1991 | Kirschner |
| 5,083,252 A | 1/1992 | McGuire |
| 5,177,509 A | 1/1993 | Johansen |
| 5,483,464 A | 1/1996 | Song |
| 5,555,492 A | 9/1996 | Feger |
| 5,745,391 A | 4/1998 | Topor |
| 5,952,096 A | 9/1999 | Yamashita |
| 6,019,476 A | 2/2000 | Kirschner |
| 6,229,252 B1 | 5/2001 | Teng et al. |
| 6,663,978 B1 | 12/2003 | Olsen |
| 6,778,238 B2 | 8/2004 | Moon |
| 6,826,001 B2 | 11/2004 | Funakura |
| 6,846,579 B2 | 1/2005 | Anderson |
| 6,955,430 B2 | 10/2005 | Pratt |
| 6,984,038 B2 | 1/2006 | Ishak |
| 6,991,849 B2 | 1/2006 | Oya |
| 7,014,336 B1 | 3/2006 | Ducharme |
| 7,019,331 B2 | 3/2006 | Winters |
| 7,019,799 B2 | 3/2006 | Utsumi |
| 7,019,903 B2 | 3/2006 | Berger |
| 7,029,118 B2 | 4/2006 | Ishak |
| 7,045,944 B2 | 5/2006 | Ushifusa |
| 7,066,596 B2 | 6/2006 | Ishak |
| 7,071,602 B2 | 7/2006 | Terui |
| 7,126,589 B2 | 10/2006 | Sung |
| 7,158,300 B2 | 1/2007 | Shimoda |
| 7,193,779 B2 | 3/2007 | Kim |
| 7,218,044 B2 | 5/2007 | Kim |
| 7,258,923 B2 | 8/2007 | Bogerd |
| 7,491,440 B2 | 2/2009 | Fukatani |
| 7,520,608 B2 | 4/2009 | Ishak |
| 7,524,060 B2 | 4/2009 | Sanchez Ramos |
| 7,556,376 B2 | 7/2009 | Ishak |
| 7,572,028 B2 | 8/2009 | Mueller |
| 7,579,769 B2 | 8/2009 | Wu |
| 7,695,180 B2 | 4/2010 | Schardt |
| 7,703,917 B2 | 4/2010 | Sanchez Ramos |
| 7,731,791 B2 | 6/2010 | Deno |
| 7,755,276 B2 | 7/2010 | Wang |
| 7,785,501 B2 | 8/2010 | Segawa |
| 7,825,578 B2 | 11/2010 | Takashima |
| 7,832,903 B2 | 11/2010 | Sanchez Ramos |
| 7,914,177 B2 | 3/2011 | Sanchez Ramos |
| 8,034,206 B2 | 10/2011 | Kim |
| 8,044,942 B1 | 10/2011 | Leonhard |
| 8,063,999 B2 | 11/2011 | Jabri |
| 8,075,133 B2 | 12/2011 | Sanchez Ramos |
| 8,075,145 B2 | 12/2011 | Engblom |
| 8,113,651 B2 | 2/2012 | Blum |
| 8,164,844 B2 | 4/2012 | Toda |
| 8,303,859 B2 | 11/2012 | Koo |
| 8,323,357 B2 | 12/2012 | Feldhues |
| 8,360,574 B2 | 1/2013 | Ishak |
| 8,403,478 B2 | 3/2013 | Ishak |
| 8,498,042 B2 | 7/2013 | Danner |
| 8,500,274 B2 | 8/2013 | Ishak |
| 8,506,114 B2 | 8/2013 | Van De Ven |
| 8,507,840 B2 | 8/2013 | Yu |
| 8,518,498 B2 | 8/2013 | Song |
| 8,547,504 B2 | 10/2013 | Guo |
| 8,570,648 B2 | 10/2013 | Sanchez Ramos |
| 8,599,542 B1 | 12/2013 | Healey |
| 8,659,724 B2 | 2/2014 | Hagiwara |
| 8,680,406 B2 | 3/2014 | Chua |
| 8,716,729 B2 | 5/2014 | Wiesmann |
| 8,767,282 B2 | 7/2014 | Hashimura |
| 8,817,207 B2 | 8/2014 | Rho |
| 8,836,209 B2 | 9/2014 | Baek |
| 8,882,267 B2 | 11/2014 | Ishak |
| 8,957,835 B2 | 2/2015 | Hoellwarth |
| 8,982,197 B2 | 3/2015 | Kim |
| 9,051,232 B2 | 6/2015 | Kosuge |
| 9,063,349 B2 | 6/2015 | Ishak |
| 9,122,089 B2 | 9/2015 | Lee |
| 9,287,471 B2 | 3/2016 | de Brouwer |
| 9,377,569 B2 | 6/2016 | Ishak |
| 9,545,304 B2 | 1/2017 | Ishak |
| 9,575,335 B1 | 2/2017 | McCabe |
| 9,798,163 B2 | 10/2017 | Ishak |
| 9,814,658 B2 | 11/2017 | Ishak |
| 9,927,635 B2 | 3/2018 | Ishak |
| 2002/0005509 A1 | 1/2002 | Teng |
| 2002/0018890 A1 | 2/2002 | Sugimachi |
| 2002/0158574 A1 | 10/2002 | Wolk |
| 2003/0214695 A1 | 11/2003 | Abramson |
| 2004/0070726 A1 | 4/2004 | Ishak |
| 2004/0114242 A1 | 6/2004 | Sharp |
| 2004/0166342 A1 | 8/2004 | Wursche |
| 2004/0246413 A1 | 9/2004 | Stephenson |
| 2004/0232813 A1 | 11/2004 | Nakano |
| 2005/0259082 A1 | 11/2005 | Potsch |
| 2005/0275769 A1 | 12/2005 | Roh |
| 2006/0012754 A1 | 1/2006 | Larson |
| 2007/0013649 A1* | 1/2007 | Kim ............... G02F 1/133377 |
| | | 345/107 |
| 2007/0077410 A1 | 4/2007 | Shi |
| 2007/0078216 A1 | 4/2007 | Cao |
| 2007/0195404 A1 | 8/2007 | Iijima |
| 2007/0216861 A1 | 9/2007 | Ishak |
| 2007/0275184 A1 | 11/2007 | Lee |
| 2008/0094566 A1 | 4/2008 | Ishak et al. |
| 2008/0137030 A1 | 6/2008 | Hoffman |
| 2008/0290787 A1 | 11/2008 | Cok |
| 2008/0297931 A1 | 12/2008 | Sanchez Ramos |
| 2009/0058250 A1 | 3/2009 | Sin |
| 2009/0105437 A1 | 4/2009 | Determan |
| 2010/0039704 A1* | 2/2010 | Hayashi ......... G02F 1/133606 |
| | | 359/485.06 |
| 2010/0134879 A1 | 6/2010 | Yoshihara |
| 2010/0231830 A1 | 9/2010 | Hirakata |
| 2011/0019269 A1 | 1/2011 | Dirk |
| 2011/0043486 A1 | 2/2011 | Hagiwara |
| 2011/0157546 A1 | 6/2011 | Ishak |
| 2011/0176325 A1 | 7/2011 | Sherman |
| 2011/0234079 A1 | 9/2011 | Eom |
| 2011/0289654 A1 | 12/2011 | Williams |
| 2011/0299168 A1 | 12/2011 | Combs |
| 2012/0021152 A1 | 1/2012 | Glaser |
| 2012/0038861 A1 | 2/2012 | Van Lieshout |
| 2012/0075577 A1 | 3/2012 | Ishak |
| 2012/0162106 A1 | 6/2012 | Choi |
| 2012/0162752 A1 | 6/2012 | Kitano |
| 2013/0009059 A1 | 1/2013 | Caruso |
| 2013/0063493 A1 | 3/2013 | House |
| 2013/0239874 A1 | 9/2013 | Smith |
| 2013/0282115 A1 | 10/2013 | Ishak |
| 2014/0049700 A1 | 2/2014 | Chen |
| 2014/0078420 A1 | 3/2014 | Liu |
| 2014/0093661 A1 | 4/2014 | Trajkovska |
| 2014/0233105 A1 | 8/2014 | Schmeder |
| 2014/0355106 A1 | 12/2014 | Laluet |
| 2014/0363767 A1 | 12/2014 | Murakami |
| 2015/0098058 A1 | 4/2015 | De Ayguavives |
| 2015/0124188 A1* | 5/2015 | Kadowaki ......... G02F 1/133514 |
| | | 349/42 |
| 2015/0160478 A1 | 6/2015 | Ishak |
| 2015/0212238 A1 | 7/2015 | Chang |
| 2015/0212352 A1 | 7/2015 | Guo et al. |
| 2015/0238308 A1 | 8/2015 | Ishak et al. |
| 2015/0248033 A1* | 9/2015 | Zhu ............... G02F 1/133536 |
| | | 349/57 |
| 2015/0253653 A1 | 9/2015 | Fujita |
| 2015/0277003 A1 | 10/2015 | Sanchez Ramos |
| 2015/0329684 A1 | 11/2015 | Kamimoto |
| 2015/0338561 A1 | 11/2015 | Moe |
| 2015/0378217 A1* | 12/2015 | Kim ............... G02F 1/133524 |
| | | 349/71 |
| 2017/0363884 A1 | 12/2017 | Hallock |

(56) References Cited

U.S. PATENT DOCUMENTS

| | | | |
|---|---|---|---|
| 2018/0052362 A1* | 2/2018 | Kang | G02F 1/133528 |
| 2018/0064616 A1 | 3/2018 | Ishak | |
| 2018/0107050 A1 | 4/2018 | Barrett | |
| 2018/0113327 A1 | 4/2018 | Ishak | |
| 2019/0121176 A1* | 4/2019 | Lee | G02F 1/133514 |
| 2019/0196071 A1 | 6/2019 | Barrett et al. | |
| 2019/0219751 A1 | 7/2019 | Barrett et al. | |

FOREIGN PATENT DOCUMENTS

| | | |
|---|---|---|
| CN | 201666985 U | 12/2010 |
| CN | 102879920 A | 1/2013 |
| CN | 202847016 U | 4/2013 |
| CN | 103448312 B | 12/2013 |
| CN | 203410122 U | 1/2014 |
| CN | 103941320 A | 7/2014 |
| CN | 204213761 U | 3/2015 |
| CN | 104614786 A | 5/2015 |
| CN | 104950515 A | 9/2015 |
| CN | 105788474 B | 2/2019 |
| CN | 106324908 B | 2/2019 |
| CN | 209782327 U | 12/2019 |
| DE | 202014000982 U1 | 3/2014 |
| EP | 0509727 A2 | 10/1992 |
| EP | 0855602 A1 | 7/1998 |
| EP | 0965034 B1 | 5/2007 |
| EP | 2085798 A1 | 8/2009 |
| EP | 2095177 A1 | 9/2009 |
| EP | 2096471 A1 | 9/2009 |
| EP | 2128889 A1 | 12/2009 |
| EP | 2260348 A2 | 12/2010 |
| EP | 1794240 B1 | 1/2013 |
| EP | 2874001 A1 | 5/2015 |
| EP | 3026485 A2 | 6/2016 |
| FR | 2909779 A1 | 6/2008 |
| JP | 2001315240 A | 11/2001 |
| JP | 2003149605 A | 5/2003 |
| JP | 2006031030 A | 2/2006 |
| JP | 2010511205 A | 4/2010 |
| JP | 2010261986 A | 11/2010 |
| JP | 2013067811 A | 4/2013 |
| JP | 2013222212 A | 10/2013 |
| JP | 2013238634 A | 11/2013 |
| JP | 2014000819 A | 1/2014 |
| JP | 2014225030 A | 12/2014 |
| JP | 2016128931 A | 7/2016 |
| KR | 10-2006-0048986 A | 5/2006 |
| KR | 101815619 B1 | 1/2018 |
| WO | 1988002871 A1 | 4/1988 |
| WO | 2002101695 A1 | 12/2002 |
| WO | 2004090589 A1 | 10/2004 |
| WO | 2005034066 A1 | 4/2005 |
| WO | 2005106542 A1 | 11/2005 |
| WO | 2007075520 A2 | 7/2007 |
| WO | 2007109202 A2 | 9/2007 |
| WO | 2007146933 A2 | 12/2007 |
| WO | 2008024414 A2 | 2/2008 |
| WO | 2008067109 A1 | 6/2008 |
| WO | 2008106449 A1 | 9/2008 |
| WO | 2009123754 A2 | 10/2009 |
| WO | 2010111499 A1 | 9/2010 |
| WO | 2012006265 A1 | 1/2012 |
| WO | 2013123592 A1 | 8/2013 |
| WO | 2013176888 A1 | 11/2013 |
| WO | 2013188825 A1 | 12/2013 |
| WO | 2014055513 A1 | 4/2014 |
| WO | 2014077166 A1 | 5/2014 |
| WO | 2014096475 A1 | 6/2014 |
| WO | 2014196638 A1 | 12/2014 |
| WO | 2015179761 | 11/2015 |
| WO | 2016205260 A1 | 12/2016 |
| WO | 2019099554 A1 | 5/2019 |

OTHER PUBLICATIONS

Search Report and Examination Opinion for European Application No. 15796219.2; dated Mar. 26, 2019; date of filing: May 22, 2015; 5 pp.
First Office Action for C.N. Application No. 201580040377.2 (national phase of PCT/US2015/032175); dated Feb. 24, 2018; date of filing: May 22, 2015; 5 pp.
Second Office Action for C.N. Application No. 201580040377.2 (national phase of PCT/US2015/032175); dated Jan. 2, 2019; date of filing: May 22, 2015; 12 pp.
First Office Action for J.P. Application No. 2017-032775 (national phase of PCT/US2015/032175); dated May 15, 2019; date of filing: May 22, 2015; 6 pp.
Second Office Action for J.P. Application No. 2017-032775 (national phase of PCT/US2015/032175); dated Feb. 4, 2020; date of filing: May 22, 2015; 22 pp.
International Search Report and Written Opinion for International Application No. PCT/US2016/037457, dated Sep. 16, 2016; date of filing: Jun. 14, 2016; 7 pp.
First Office Action for C.N. Application No. 201680048240.6 (national phase of PCT/US2016/037457); dated Jan. 16, 2020; date of filing: Jun. 14, 2016; 10 pp.
Non-Final Office Action for U.S. Appl. No. 15/844,109; dated Sep. 4, 2019; filed Dec. 15, 2017; 49 pp.
Final Office Action for U.S. Appl. No. 15/844,109; dated Jan. 16, 2020; filed Dec. 15, 2017; 12 pp.
International Search Report and Written Opinion for International Application No. PCT/US2018/061103, dated Jan. 24, 2019; date of filing: Nov. 14, 2018; 6 pp.
Non-Final Office Action for U.S. Appl. No. 16/360,599; dated Jun. 28, 2019; date of filing: Mar. 21, 2019; 11 pp.
Abramowitz, Mortimer and Davidson, Michael W. "Kodak Color Compensating Filters Yellow." Olympus Microscopy Resource Center. olympus-lifescience.com. Retrieved May 16, 2019.
Doeffinger, Derek, editor. Using Filters. Eastman Kodak Company, 1988. The Kodak Workshop Series, pp. 11, 13, 17, 46, 68-69.
Fonseca, "Apple patents a virtual reality headset for iPhone," http://vr-zone.com/articles/apple-patents-virtual-reality-headset-iphone/87267.html, Jun. 22, 2015, 4 pp.
Van Der Lely, et al., "Blue Blocker Glasses as a Countermeasure for Alerting Effects of Evening Light-Emitting Diode Screen Exposure in Male Teenagers," Journal of Adolescent Health, Aug. 2014, 7 pp.
Kim, Boris F. and Bohandy, Joseph. "Spectroscopy of Porphyrins." Johns Hopkins APL Technical Digest, vol. 2, No. 1, 1981, pp. 153-163, www.jhuapl.edu/techdigest/views/pdfs.V02_N3 . . . /V2_N3_1981_Kim. Retrieved Apr. 12, 2019.
Giovannetti, Rita. "The Use of Spectrophotometry UV-Vis for the Study of Porphyrins." Macro to Nano Spectroscopy, Uddin, Jamal (Ed.), IntechOpen Limited, 2012, pp. 87-108, www.intechopen.com/books/macro-to-nano-spectroscopy/the-use-of-spectrophotometry-uv-vis-for-thestudy-of-porphyrins. Retrieved Apr. 12, 2019.
Fritz, Norman L. "Filters: An Aid in Color-Infrared Photography." Photogrammetric Engineering and Remote Sensing, vol. 43, No. 1, Jan. 1977, pp. 61-72, www.asprs.org/wp-content/uploads/pers/1977journal/.../1977_jan_61-72. Retrieved Apr. 4, 2019.
Perovich, B. W. "Black and White Filters Tutorial." Freestyle Photographic Supplies. www.freestylephoto.biz/black-and-white-filters-tutorial. Retrieved Apr. 12, 2019.
Richards, Bryce S. "Up- and Down-Conversion Materials for Photovoltaic Devices" Proceedings of SPIE—The International Society for Optical Engineering, 9 pp. Apr. 2012.
Simmons, Adam "The Evolution of LED Backlights." PC Monitors www.pcmonitorsinfo/articles. Retrieved May 1, 2017.
Gallas, Jim and Eisner, Mel; Chapter 23—Eye protection from sunlight damage; Journal; 2001; 437, 439-455; vol. 3. Comprehensive Series in Photosciences, Elvesier, abstract only.
"Capturing All the Light: Panchromatic Visible Absorption for Solar Photoconversion." U.S. Department of Energy, Basic Energy Sciences, Jun. 1, 2014, science.energy.gov/bes/highlights/2014/bes-2014-06-g/. Retrieved Apr. 12, 2019.
"Filters for Color Photomicrography," Olympus America Inc., Olympus Microscopy Resource Center, http://www.olympusmicro.com/primer/photomicrography/colorfilters.html, Mar. 2012, 7 pp.

(56) References Cited

OTHER PUBLICATIONS

"Kentek Laser Safe Window Protection", Retrieved at <<http://www.kenteklaserstore.com/category.aspx?categoryID=311>>, 1 pp. Retrieved on Apr. 28, 2014.

"Laser and fluorescent dyes, UV and NIR dyes, security inks and other optically functional materials", Retrieved at http://www.fabricolorholding.com/product, 2 pp. Retrieved May 18, 2015.

"Reticare, the first ocular protector for electronic device screens to launch at CES 2014"; https://www.reticare.com/tienda/en/blog/post/3-reticare-the-first-ocular-protector-for-electronic-device-screens-to-launch-at-ces-2014; Jan. 10, 2014; 7 pp. Retrieved Nov. 30, 2017.

"Spectral-Transmittance Bar Charts for Selected Kodak Wratten Filters." google search (www.google.com), search terms: kodak wratten filters bar chart, second image (wratten filter specs, iclane.net). Retrieved May 16, 2019.

"XGear Krystal Sapphire Screen Protector Film Shield For Apple IPhone 4 4S", Retrieved at <<http://www.ebay.com/itm/XGear-Krystal-Sapphire-Screen-Protector-Film-Shield-For-Apple-IPhone-4-4S-/221364527502>>, 3 pp. Retrieved Apr. 28, 2014.

ebay.com, screenshot of ebay purchase of Apr. 23, 2019. Retrieved May 16, 2019.

Illuminant D65, 4 pp.

Kodak advertisement. Buchsbaum, Ralph. Animals Without Backbones. The University of Chicago Press, 1948.

"290 nm UV Dye", Technical Data Sheet, Product Code: UV290A, QCR Solutions Corp, Version: 2011.UV Dyes, www.qcrsolutions.com, 1 page.

"530 nm Visible Dye", Technical Data Sheet, Product Code: VIS530A, QCR Solutions Corp, Version: 2011.VIS Dyes, www.qcrsolutions.com, 1 page.

"675 nm Visible Dye", Technical Data Sheet, Product Code: VIS675F, QCR Solutions Corp, Version: 2011.VIS Dyes, www.qcrsolutions.com, 1 page.

"ABS 668: Visible Narrow Band Absorber", Exciton, Inc., www.exciton.com, 1 page.

"ABS 691: Visible Narrow Band Absorber", Exciton, Inc., www.exciton.com, 1 page.

"DYE VIS 347", Adam Gates & Company, LLC, www.adamgatescompany.com, 1 page.

"DYE VIS 670", Adam Gates & Company, LLC, www.adamgatescompany.com, 1 page.

"DYE VIS 671", Adam Gates & Company, LLC, www.adamgatescompany.com, 1 page.

"ADS640PP Product Specification", American Dye Source, Inc., Retrieved at <<https://adsdyes.com/products/laser-dyes-2/ads640pp/>>, Retrieved on May 18, 2015, 1 page.

"Infrared Dye 1422", Adam Gates & Company, LLC, www.adamgatescompany.com, 1 page.

"1003 nm NIR Dye", Technical Data Sheet, Product Code: NIR1003A, QCR Solutions Corp, Version 2011.NIR Dyes, www.qcrsolutions.com, 1 page.

"1031 nm NIR Dye", Technical Data Sheet, Product Code: NIR1031M, QCR Solutions Corp, Version: 2011.NIR Dyes, www.qcrsolutions.com, 1 page.

"1072 nm NIR Dye", Technical Data Sheet, Product Code: NIR1072A, QCR Solutions Corp, Version: 2011.NIR Dyes, www.qcrsolutions.com, 1 page.

"1073nm NIR Dye", Technical Data Sheet, Product Code: IR Dye 1151, Adam Gates & Company, LLC, www.adamgatescompany.com, 1 page.

"LUM690 Near Infrared Dye", Moleculum, moleculum.com, Jan. 2015, 2 pages.

"LUM995 Near Infrared Dye", Moleculum, moleculum.com, Jan. 2015, 2 pages.

"Near Infrared Dye: LUM1000A", Moleculum, moleculum.com, Jan. 2015, 1 page.

"Tinuvin P Benzotriazole UV Absorber", Ciba Specialty Chemicals, Inc.,Printing Date: Aug. 1998, 2 pages.

A-594-5 Invisible Blue Pigment, dayglo.com, 1 page. Retrieved Jun. 2, 2019.

Sunstone Luminescent UCP Nanocrystals, sigmaaldrich.com, 7 pp. Retrieved Apr. 17, 2017.

"New ANSI/ISEA Z87.1-2010 Standard", Uvex by Sperian, 2 pages.

ANSI Z80.3-2015, Nonprescription Sunglass and Fashion Eyewear Requirements, 41 pp.

ASTM International E 313-05; Standard Practice for Calculating Yellowness and Whiteness Indices from Instrumentally Measured Color Coordinates; Article; 6 pp.

U.S. Appl. No. 16/695,975, filed Nov. 26, 2019; 52 pp.

U.S. Appl. No. 16/696,516, filed Nov. 26, 2019; 60 pp.

Non-Final Office Action for U.S. Appl. No. 14/719,604; dated Aug. 24, 2016; filed May 22, 2015; 41 pp.

Final Office Action for U.S. Appl. No. 14/719,604; dated Mar. 28, 2017; filed May 22, 2015; 66 pp.

Non-Final Office Action for U.S. Appl. No. 14/719,604; dated Aug. 30, 2017; filed May 22, 2015; 59 pp.

International Search Report and Written Opinion for International Application No. PCT/US2015/032175, dated Aug. 28, 2015; filed May 22, 2015; 10 pp.

\* cited by examiner

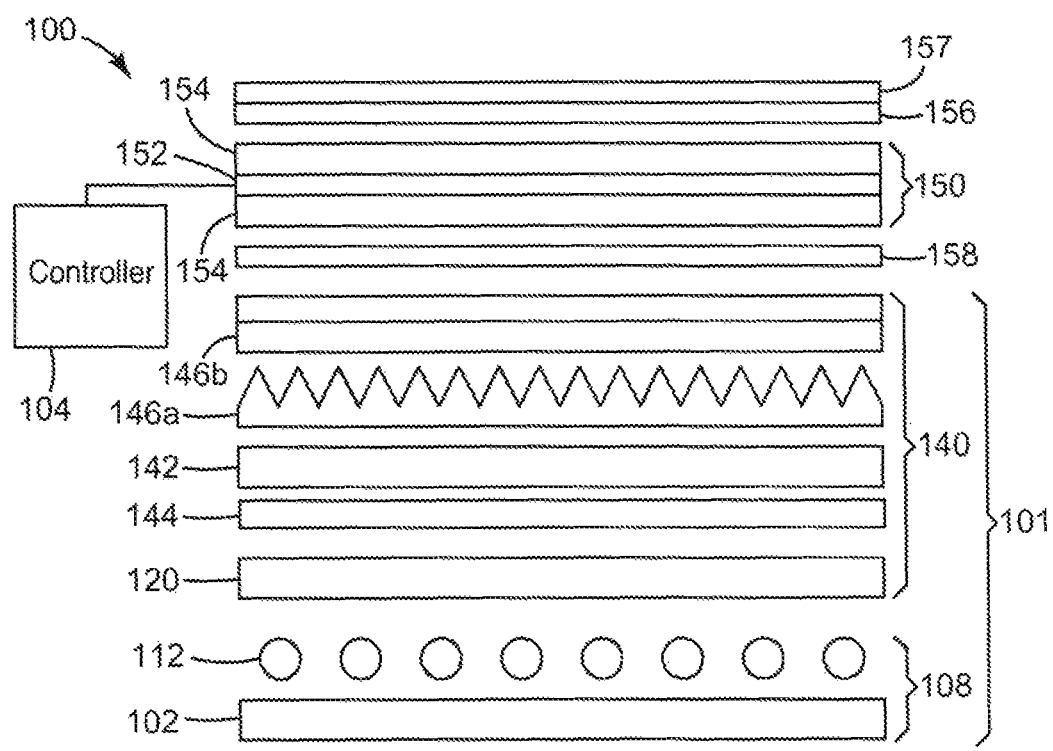

LIGHT EMISSION MODIFICATION

CROSS-REFERENCE TO RELATED APPLICATIONS

This application claims the benefit of U. S. Provisional Pat. Ser. No. 62/772,513, filed Nov. 28, 2018 and titled LIGHT EMISSION MODIFICATION. This application also is related to cofiled and copending U.S. patent application Ser. No. 16/695,975, filed Nov. 26, 2019, and titled LIGHT EMISSION MODIFICATION. This application is related to U.S. Nonprovisional patent application Ser. No. 14/719,604, filed May 22, 2015, and titled LIGHT EMISSION REDUCING FILM FOR ELECTRONIC DEVICES, International Application under the Patent Cooperation Treaty No. PCT/US2015/032175, filed May 22, 2015 and titled LIGHT EMISSION REDUCING FILM FOR ELECTRONIC DEVICES, International Application under the Patent Cooperation Treaty No. PCT/US2016/037457, filed Jun. 14, 2016 and titled LIGHT EMISSION REDUCING COMPOUNDS FOR ELECTRONIC DEVICES, and any other U.S., International, or national phase patent applications stemming from the aforementioned applications. All references cited within are incorporated herein by reference in their entirety.

FIELD

The present disclosure relates to display systems that include light conversion materials.

BACKGROUND

Handheld, tablet, computer, and other device displays have trended toward higher resolutions and truer color balance. While a variety of methods can be used to achieve resolution and color, many high-performance displays include LEDs that can result in high levels of blue within the output spectrum. Many of these devices are battery powered, and users typically desire long battery life. Longer battery life generally calls for low power consumption, as well as various means for light conservation. Frequently these displays generally have not prioritized eye safety as a design goal. A growing body of medical research is developing that indicates a "toxic" blue portion of the color spectrum can have adverse effects on the eye such that in the longer term, vision impairment can result. In addition, a new body of knowledge is showing that adverse effects can occur on the natural circadian rhythm of individuals from certain portions of the optical spectrum. The present disclosure describes materials and incorporation of these materials in a mobile, tablet or PC display that are highly selective in their ability to reduce exposure to harmful blue and UV light. These materials can be optimized as a function of wavelength to maintain color white point. Many of these materials reduce total light transmission. However, some of these materials, as described in the present disclosure, can convert or recycle harmful portions of the spectrum to optical wavelengths that are not harmful. In this manner, a balance of reduction of harmful color frequencies, maintenance of optical clarity, and maintenance of true white color balance can be achieved with minimal loss in display brightness. In light of recent medical findings, increasingly ubiquitous displays, and consumer demand for high quality in displays, systems of the present disclosure solve multiple needs in a unique way.

SUMMARY

To address eye safety, display systems are provided that incorporate materials into mobile, tablet, or personal computer displays that are can reduce exposure to harmful blue and ultraviolet light. The instant disclosure provides display systems that include materials the convert or recycle harmful portions of the visible electromagnetic spectrum into optical wavelengths that are less harmful while maintaining a balance of reduction in harmful color frequencies, maintenance of optical clarity, and maintenance of true white color balance with minimum loss in display brightness.

In one aspect, a display system is disclosed that addresses the above issues. The disclosed display system includes a backlight that includes light-emitting diodes. The light-emitting diodes can emit white light or RGB (red-green-blue) light. The disclosed display system further includes a liquid crystal panel that is configured to control the transmission of light from the backlight that is visible to a viewer. Additionally, the disclosed display system includes one or more optical films. The films can incorporate one or more light conversion materials. The one or more optical films are positioned such that light from the backlight passes through the one or more optical films before reaching the viewer. Each of the one or more light conversion materials can absorb light in a first wavelength range and remit that light in a second wavelength range.

In another aspect, a method of converting light from a first wavelength to a second wavelength is disclosed that includes a display system. The disclosed method includes incorporating a display system into or onto the output display of an electronic device—typically a portable electronic display device. The display system can be incorporated integral to the electronic display or may be applied externally to the face of the display of the electronic display device. The display system includes a backlight that includes light-emitting diodes. The light-emitting diodes can emit white light or RGB (red-green-blue) light. The disclosed display system further includes a liquid crystal panel that is configured to control the transmission of light from the backlight that is visible to a viewer. Additionally, the disclosed display system includes one or more optical films. The films can incorporate one or more light conversion materials. The one or more optical films are positioned such that light from the backlight passes through the one or more optical films before reaching the viewer. Each of the one or more light conversion materials can absorb light in a first wavelength range and remit that light in a second wavelength range.

Features and advantages of the present disclosure will be more readily understood from the following detailed description which should be read in conjunction with the accompanying drawings.

BRIEF DESCRIPTION OF THE DRAWING

The drawing is a schematic illustrations and is not intended to limit the scope of the invention in any way. The drawing is not necessarily to scale.

FIG. 1 is a schematic cross-sectional view of an exemplary display system according to this disclosure.

DETAILED DESCRIPTION

Various embodiments will be described in detail with reference to the drawing, Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

FIG. 1 is a schematic cross-sectional view of an example display system 100 with which systems of the present disclosure may be beneficially employed. Display system 100 may be used, for example, in a liquid crystal display (LCD) monitor, LCD-TV, handheld, tablet, laptop, or other computing device. Display system 100 of FIG. 1 is merely exemplary, however, and the systems of the present disclosure are not limited to use with systems like or similar to system 100. The systems of the present disclosure may be beneficially employed in other varieties of displays systems that do not necessarily include liquid crystal display technology.

Display system 100 can include liquid crystal (LC) panel 150 and illumination assembly 101 positioned to provide illumination light to LC panel 150. LC panel 150 includes LC layer 152 disposed between panel plates 154. Plates 154 can include electrode structures and alignment layers on their inner surfaces for controlling the orientation of the liquid crystals in the LC layer 152. These electrode structures can be arranged so as to define LC panel pixels. A color filter can also be included with one or more of plates 152 for imposing color on the image displayed by LC panel 150.

LC panel 150 can be positioned between upper absorbing polarizer 156 and lower absorbing polarizer 158. Absorbing polarizers 156, 158 and LC panel 150 in combination can control the transmission of light from illumination assembly 101 to a viewer, the viewer generally being positioned toward the top of FIG. 1 and looking generally downward (relative to FIG. 1) at display system 100. Controller 104 can selectively activate pixels of LC layer 152 to form an image seen by the viewer.

One or more optional layers 157, can be provided over upper absorbing polarizer 156, for example, to provide optical function and/or mechanical and/or environmental protection to the display.

Illumination assembly 101 can include backlight 108 and one or more light management films 140 positioned between backlight 108 and LC panel 150. Backlight 108 of display system 100 include light sources 112 that generate the light that illuminates LC panel 150. Light sources 112 can include any suitable lighting technology. In some embodiments, light sources 112 can be light-emitting diodes (LEDs), and in some cases, can be white LEDs. Backlight 108 as illustrated can be a "direct-lit" backlight in which an array of light sources 112 are located behind LC panel 150 substantially across much or all of the panel's area. Backlight 108 as illustrated is merely schematic, however, and many other backlight configurations are possible. Some display systems, for example, can include a "side-lit" backlight with light sources (such as LEDs) located at one or more sides of a light-guide that can distribute the light from the light sources substantially across much or all of the area of LC panel 150.

In some embodiments, backlight 108 emits generally white light, and LC panel 150 is combined with a color filter matrix to form groups of multicolored pixels so that the displayed image is polychromatic.

Backlight 108 also includes reflective substrate 102 for reflecting light from light sources 112 propagating in a direction away from LC panel 150. Reflective substrate 102 may also be useful for recycling light within display system 100.

Arrangement 140 of light management films, which may also be referred to as a film stack, a backlight film stack, or a light management unit, can be positioned between backlight 108 and LC panel 150. Light management films 140 can affect the illumination light propagating from backlight 108 so as to improve the operation of display system 100. Light management unit 140 need not necessarily include all components as illustrated and described herein.

Arrangement 140 of light management films can include diffuser 120. Diffuser 120 can diffuse the light received from light sources 112, which can result in increased uniformity of the illumination light incident on LC panel 150. Diffuser layer 120 may be any suitable diffuser film or plate.

Light management unit 140 can include reflective polarizer 142. Light sources 112 typically produce unpolarized light, but lower absorbing polarizer 158 only transmits a single polarization state; therefore, about half of the light generated by light sources 112 is not transmitted through to LC layer 152. Reflective polarizer 142, however, may be used to reflect the light that would otherwise be absorbed in lower absorbing polarizer 158. Consequently, this light may be recycled by reflection between reflective polarizer 142 and underlying display components, including reflective substrate 102. At least some of the light reflected by reflective polarizer 142 may be depolarized and subsequently returned to reflective polarizer 142 in a polarization state that is transmitted through reflective polarizer 142 and lower absorbing polarizer 158 to LC layer 152. In this manner, reflective polarizer 142 can be used to increase the fraction of light emitted by light sources 112 that reaches LC layer 152, thereby providing a brighter display output. Any suitable type of reflective polarizer may be used for reflective polarizer 142.

In some embodiments, polarization control layer 144 can be provided between diffuser plate 120 and reflective polarizer 142. Polarization control layer 144 can be used to change the polarization of light that is reflected from reflective polarizer 142 so that an increased fraction of the recycled light is transmitted through reflective polarizer 142.

Arrangement 140 of light management films can also include one or more brightness enhancing layers. A brightness enhancing layer can include a surface structure that redirects off-axis light in a direction closer to the axis of the display. This can increase the amount of light propagating on-axis through LC layer 152, thus increasing the brightness of the image seen by the viewer. One example of a brightness enhancing layer is a prismatic brightness enhancing layer, which has a number of prismatic ridges that redirect the illumination light through refraction and reflection. Examples of prismatic brightness enhancing layers include BEF prismatic films available from 3M Company. Other varieties of brightness enhancing layers can incorporate non-prismatic structures.

The exemplary embodiment illustrated in FIG. 1 shows first brightness enhancing layer 146a disposed between reflective polarizer 142 and LC panel 150. Prismatic brightness enhancing layer 146a typically provides optical gain in one dimension. An optional second brightness enhancing layer 146b may also be included in arrangement 140 of light management layers, having its prismatic structure oriented orthogonally to the prismatic structure of first brightness enhancing layer 146a. Such a configuration provides an increase in the optical gain of display system 100 in two dimensions. In other exemplary embodiments, brightness enhancing layers 146a, 146b may be positioned between backlight 108 and reflective polarizer 142.

The different layers in light management unit 140 can be free standing. In other embodiments, two or more of the layers in light management unit 140 may be laminated together. In other exemplary embodiments, light management unit 140 may include two or more subassemblies.

It is to be understood that as a schematic diagram, the components of display system 100 are not illustrated to scale, and generally are shown with greatly exaggerated thickness (along the up-down direction of FIG. 1) compared to their lateral extent (along the left-right direction). Many elements of display system 100, including (but not necessarily limited to) 102, 120, 142, 144, 146a, 146b, 152, 154, 156, and 157 can extend in two dimensions generally orthogonal to their thickness (i.e., perpendicular to the plane of FIG. 1) over an area approximately equal to a viewable area of the display, which may be referred to as a "display area."

Returning to backlight 108, in some embodiments light sources 112 can emit significant amounts of light in potentially harmful wavelength ranges, such as UV and blue light ranges (particularly below about 455 nm). In display system 100 that does not include systems of the present disclosure, significant amounts of such potentially harmful light can be emitted by display system 100 toward a user (upward relative to FIG. 1). In this context a "significant" amount of light can mean an amount of light that may result in deleterious health effects for a display user. In view of this hazard, the present disclosure provides systems for reducing the amount of harmful blue light emitted from display systems such as system 100.

In some approaches to mitigating the hazards of blue light emissions from electronic device displays, absorbing materials can be used to reduce the amount of light in particular wavelength ranges (such as UV and blue light wavelength ranges) that reach users' eyes. Some of these solutions are described in U.S. patent application Ser. No. 14/719,604, filed May 22, 2015 and titled LIGHT EMISSION REDUCING FILM FOR ELECTRONIC DEVICES, International Application under the Patent Cooperation Treaty No. PCT/US2015/032175, filed May 22, 2015 and titled LIGHT EMISSION REDUCING FILM FOR ELECTRONIC DEVICES, and PCT Pat. Appl. Ser. No. PCT/US2016/037457, filed Jun. 14, 2016 and titled LIGHT EMISSION REDUCING COMPOUNDS FOR ELECTRONIC DEVICES, which are incorporated by reference limited such that no subject matter is incorporated that is contrary to the explicit disclosure herein.

Approaches to blue light emission mitigation that are based upon absorption of light (or that otherwise remove light), without subsequent emission of light in the visible region of the electromagnetic spectrum, can generally result in a decrease in the brightness (measured and/or perceived) of a display, as compared with an otherwise identical reference display without such absorption features. In some cases, to compensate for such an absorption-related brightness decrease, the power input to a display is increased (relative to the power input to a reference display). Generally, increases in display power consumption can be undesirable, particularly in portable devices where they may negatively impact battery life.

In the present disclosure, systems for modifying the emission of light from displays are disclosed in which light conversion materials can be employed away from light sources (such as light sources 112 of FIG. 1) of a display. Light conversion materials generally can absorb light in a first wavelength range and emit light in a second wavelength range (thus "converting" light from one wavelength range to another). In the present disclosure, conversion from shorter wavelengths to longer wavelengths can be referred to as "upconversion" and conversion from longer wavelengths to shorter wavelengths can be referred to as "downconversion." It should be recognized that these definitions may not be universal, however, and that other documents may define upconversion and downconversion oppositely (for example, some documents may define such terms relative to frequency, which is inversely related to wavelength).

Systems using light conversion materials away from light sources of a display can be used to absorb light in less-useful or harmful wavelength ranges, such as UV and blue light ranges (particularly below about 455 nm) and re-emit light in more benign wavelength ranges (from a health perspective) that can be more useful, such as in green and/or red wavelength ranges. In some cases, light can be upconverted from shorter blue wavelengths (at or below 455 nm) to longer blue wavelengths that can be less harmful and also useful for display illumination. In ways such as these, systems using light conversion materials away from light sources can modify the emission of light from display systems, relative to display systems not employing such light conversion materials.

In some examples, systems using light conversion materials away from light sources of a display can be employed with electronic device displays to mitigate blue light emissions such that the resulting display systems can achieve brightnesses comparable to reference displays without light conversion materials away from light sources, while consuming not more than 10% more energy than the reference displays.

Systems using light conversion materials away from light sources can improve the color balance of a display, compared to some known prior approaches to reducing blue light emissions from a display that do not employ light conversion materials away from light sources. Some such known prior approaches can reduce blue light emissions by absorbing or otherwise removing a portion of blue light from the spectrum, thus altering the spectral balance of the light emitted from the display. In systems of the present disclosure, in addition to reducing the amount of hazardous blue light emitted from an electronic display device, light conversion materials away from light sources can re-emit light that can contribute to, aid, or otherwise improve the color balance of light emitted from an electronic display device, as compared with an otherwise similar display with blue light mitigation that does not include such light conversion materials. In some embodiments, display systems that include systems of the present disclosure incorporating light conversion materials away from light sources can maintain a D65 white point. In some embodiments, display systems that include systems of the present disclosure incorporating light conversion materials away from light sources can maintain a correlated color temperature (CCT) substantially the same as a reference display system without the blue light mitigation systems of the present disclosure.

In some embodiments of systems of the present disclosure, light conversion materials can be used in combination with light absorbing materials to reduce hazardous blue light emissions from, and improve or maintain the color balance of, a display system.

Systems of the present disclosure can include multiple light conversion materials that can absorb light from multiple wavelength ranges, including wavelength ranges other than UV or blue wavelength ranges.

In some embodiments, systems of the present disclosure can employ light conversion materials that absorb light from a wavelength range that is not considered to pose health risks. The absorption and emission of such a light conversion material can be employed, for example, to improve or otherwise contribute to the color balance of a display.

Any suitable light conversion materials can be used in systems of the present disclosure. Without limitation, employed light conversion materials can include:
- organic materials
- inorganic materials, which can be mined materials
- Raman-scattering materials
- Anti-Stokes materials
- materials known for other non-display applications, such as fingerprint dusting
- fluorescent pigments, such as those available from Day-Glo Color Corp (for example, DAYGLO A-594-5). Surprisingly, materials that are used commonly in applications requiring florescent behavior can be used in light filtering applications with great spectral efficiency.
- luminescent nanocrystals such as SUNSTONE Luminescent UCP Nanocrystals available from Sigma Aldrich Co., LLC.

In some embodiments of systems of the present disclosure, light conversion materials can be located in any suitable location away from light sources of the display. In some embodiments, light conversion materials can be included in, on, or with one or more films of light management films 140, and or another film or films not illustrated in FIG. 1. In general, light conversion materials can re-emit light with different directionality and/or polarization compared with light absorbed by the light conversion materials. Accordingly, in some embodiments light conversion materials can be included below (relative to the orientation of FIG. 1) one or more of reflective polarizer 142 and/or brightness enhancement layers 146a, 146b, such that re-emitted light passes through films 142, 146a, and 146b (if such films are present in the display system) before exiting the display toward a user. However, this is not limiting, and light conversion materials potentially can be located in, or, or with any component of light management films 140.

In some embodiments of systems of the present disclosure, light conversion materials can be included in, on, or with a display layer between LC layer 152 and a user, such as layer 157 of FIG. 1.

In some embodiments of systems of the present disclosure, light conversion materials can be included in, on, or with reflective substrate 102.

In some embodiments of systems of the present disclosure, light conversion materials can be distributed substantially about an entire area corresponding to the display area of a display when included or provided in, on, or with a film of light management films 140, reflector 102, or another layer, such as layer 157. In some such embodiments, light conversion materials can be distributed substantially uniformly over such an area.

Light conversion materials can be included or provided in, on, or with a film of light management films 140, reflector 102, or another layer, such as layer 157, in any suitable manner. In some embodiments, light conversion materials can be extruded or cast with a film. In some embodiments, light conversion materials can be coated onto a film. In some embodiments, light conversion materials can be provided in or with an adhesive used to bond or laminate one or more layers of a display system, such as any suitable layers or films of display system 100. Such an adhesive incorporating light conversion materials can be substantially optically clear, exhibiting negligible scattering of light transmitted through the adhesive, other than redirection of light associated with absorption and re-emission by light conversion materials.

In some embodiments, light conversion materials can be solubly or insolubly distributed or dispersed throughout a material that is a component or precursor of any suitable film or layer of display system 100, such as a polymer resin or an adhesive. In some embodiments, light conversion materials can comprise nanoparticles, some which may be insoluble in polymers and commonly used solvents. While homogeneous distribution may be more easily achieved in some systems with soluble light conversion materials, heterogeneous even distribution can be achieved with insoluble light conversion material with appropriate handling during manufacture.

In some embodiments, light conversion materials can be index-matched to materials or media into which they are incorporated, such that they can appear essentially optically "invisible" in wavelength ranges other than ranges in which they absorb and re-emit light, and that films or other materials incorporating the light conversion materials appear essentially optically clear. In some other embodiments, index differences between light conversion materials and materials or media into which they are incorporated can be exploited for other optical functions, such as (but not necessarily limited to) diffusion and reflection. Index matching or index adjustment can be affected by making inorganic nanoparticles suitably small, and chemically coupling them to an organic adhesive. Likewise, the design of the organic molecule itself can tune index. An example, silicones tend toward relatively lower optical indices while complex hydrocarbons tend toward relatively higher optical indices. Organo-functional ligand ends can modify index in the adhesive.

Systems of the present disclosure incorporating light conversion materials can be custom designed to retrofit into existing display systems, with selectable design parameters including choice of light conversion materials and also other non-converting blocking or filtering compounds. In other examples, new display systems can be designed that employ systems of the present disclosure incorporating light conversion materials. Through judicious choices of LEDs (and/or other light sources), light conversion materials, other non-converting blocking or filtering compounds, and other optical films and devices, numerous combinations of approaches can be developed to provide displays that addresses eye health concerns while providing high display quality.

While embodiments of the invention have been illustrated and described, it will also be apparent that various modifications can be made without departing from the scope of the invention. It is also contemplated that various combinations or sub combinations of the specific features and aspects of the disclosed embodiments can be combined with or substituted for one another in order to form varying modes of the invention. Accordingly, it is not intended that the invention be limited, except as by the appended claims. All references cited within are herein incorporated by reference in their entirety.

What is claimed is:
1. A display system comprising:
   a backlight comprising light-emitting diodes, the backlight emitting white light; and
   a liquid crystal panel configured to control transmission of light from the backlight to a viewer, wherein the display system further comprises one or more light management films comprising one or more light conversion materials between the backlight and the liquid crystal panel, wherein each of the one or more light conversion materials absorbs light in a first wavelength range and re-emits light in a second wavelength range, wherein the light conversion materials are used in combination with light absorbing materials to reduce hazardous blue light emissions of below about 455 nm.

2. A display system according to claim 1, wherein the backlight comprises light sources that generate light that illuminates the liquid crystal panel.

3. A display system according to claim 2, wherein the light sources comprise an array of light sources located behind the liquid crystal panel substantially across the area of the liquid crystal panel.

4. A display system according to claim 1, wherein the backlight comprises light sources located at one or more sides of a light-guide.

5. A display system according to claim 1, wherein the light conversion materials are selected from organic materials, inorganic materials, Raman-scattering materials, Anti-Stokes materials, fluorescent pigments, and materials used for fingerprint dusting.

6. A display system according to claim 1, wherein the one or more optical films comprises a light management system positioned between the backlight and the liquid crystal panel.

7. A display system according to claim 6, wherein the light management system comprises a diffuser plate or a reflective polarizer.

8. A display system according to claim 6, wherein the light management system comprises a diffuser plate and a reflective polarizer.

9. A display system according to claim 1, further comprising a polarizer control layer between the diffuser plate and the reflective polarizer.

10. A display system according to claim 1, wherein the liquid crystal panel comprises a liquid crystal layer disposed between panel plates.

11. A display system according to claim 10, wherein the panel plates comprise electrode structures and alignment layers on their respective inner surfaces.

12. A display system according to claim 11, wherein the electrode structures and alignment layers control the orientation of liquid crystals in the liquid crystal layer.

13. A display system according to claim 10, wherein the panel plates comprise a color filter.

14. A display system according to claim 1, wherein the liquid crystal panel is positioned between an upper absorbing polarizer layer and a lower absorbing polarizing layer.

15. A display system according to claim 1, further comprising a controller that selectively activates pixels of the liquid crystal layer to form an image.

16. A display system according to claim 1, further comprising a first prismatic brightness enhancing layer disposed between a reflective polarizer and the liquid crystal panel.

17. A display system according to claim 16, further comprising a second prismatic brightness enhancing layer with prismatic structure oriented orthogonal to the prismatic structure of the first prismatic brightness enhancing layer.

18. A display system according to claim 1, wherein the light management films allow the display system to maintain a D65 white point.

19. A display system according to claim 1, wherein the light management films allow the display to maintain a correlated temperature substantially the same as a reference display system without the light management films.

20. A method of a method of converting light comprising:
  providing a display system, wherein the display system comprises
    a backlight comprising light-emitting diodes, the backlight emitting white light; and
    a liquid crystal panel configured to control transmission of light from the backlight to a viewer,
  wherein the display system further comprises one or more light management films comprising one or more light conversion materials between the backlight and the liquid crystal panel, wherein each of the one or more light conversion materials absorbs light in a first wavelength range and re-emits light in a second wavelength range, and
  wherein the light conversion materials are used in combination with light absorbing materials to reduce hazardous blue light emissions of below about 455 nm; and
  incorporating the display system into the display of an electronic display device.

* * * * *